United States Patent
Baker et al.

(10) Patent No.: US 6,732,191 B1
(45) Date of Patent: *May 4, 2004

(54) WEB INTERFACE TO AN INPUT/OUTPUT DEVICE

(75) Inventors: Richard A. Baker, West Newbury, MA (US); Dennis J. W. Dube, Pelham, NH (US)

(73) Assignee: Schneider Automation Inc., North Andover, MA (US)

( * ) Notice: Subject to any disclaimer, the term of this patent is extended or adjusted under 35 U.S.C. 154(b) by 563 days.

This patent is subject to a terminal disclaimer.

(21) Appl. No.: 09/595,159

(22) Filed: Jun. 15, 2000

Related U.S. Application Data

(63) Continuation-in-part of application No. 08/927,005, filed on Sep. 10, 1997, now Pat. No. 6,282,454.

(51) Int. Cl.[7] .................................................. G06F 3/00
(52) U.S. Cl. ............................ 710/1; 710/33; 710/105; 709/230; 709/250; 712/225
(58) Field of Search ........................ 710/1, 18, 20, 710/36, 31, 105, 33, 39, 40; 712/225; 700/83, 67; 709/218, 219, 230, 250

(56) References Cited

U.S. PATENT DOCUMENTS

| | | |
|---|---|---|
| 3,971,000 A | 7/1976 | Cromwell |
| 4,251,858 A | 2/1981 | Cambigue et al. |
| 4,319,338 A | 3/1982 | Grudowski et al. |
| 4,688,167 A | 8/1987 | Agarwal |
| 4,701,845 A | 10/1987 | Andreasen et al. |
| 4,845,644 A | 7/1989 | Anthias et al. |
| 4,858,152 A | 8/1989 | Estes |
| 4,897,777 A | 1/1990 | Janke et al. |
| 4,912,623 A | 3/1990 | Rantala et al. |
| 4,937,777 A | 6/1990 | Flood et al. |
| 4,949,274 A | 8/1990 | Hollander et al. |
| 4,953,074 A | 8/1990 | Kametani et al. |
| 4,974,151 A | 11/1990 | Advani et al. |
| 4,979,107 A | 12/1990 | Advani et al. |
| 4,992,926 A | 2/1991 | Janke et al. |
| 5,012,402 A | 4/1991 | Akiyama |
| 5,023,770 A | 6/1991 | Siverling |

(List continued on next page.)

FOREIGN PATENT DOCUMENTS

| | | |
|---|---|---|
| DE | 44 10 171 C1 | 4/1995 |
| DE | 296 00 609 U1 | 3/1997 |
| DE | 196 15 093 A1 | 10/1997 |
| EP | 0 542 657 A1 | 5/1993 |
| EP | 0 814 393 A1 | 12/1997 |
| JP | 60192447 A | 9/1985 |
| WO | WO 97/18636 | 5/1997 |
| WO | WO 98/53581 | 11/1998 |

OTHER PUBLICATIONS

*Abstract of "Implementing distributed controls for FMC's using Internet utilities," S. S. Jagdale and N. Merchant; Computers of Industrial Engineering, vol. 31, No. 1–2, pp. 87–90; Oct., 1996 (UK).

(List continued on next page.)

Primary Examiner—Jeffrey Gaffin
Assistant Examiner—Rijue Mai
(74) Attorney, Agent, or Firm—Larry I. Golden

(57) ABSTRACT

A control system allows a user to access an input/output device over a communication network using a web browser. The system includes an Internet web site between the network and the input/output module. The web site runs from an Ethernet board coupled directly to the input/output module back plane and includes a HTTP protocol interpreter, an input/output module, a TCP/IP stack, and an Ethernet board kernel. The web site provides access to the input/output module by a user at a remote location through the Internet. The web site translates the industry standard Ethernet, TCP/IP and HTTP protocols used on the Internet into data recognizable to the input/output module. Using this interface, the user can input or retrieve all pertinent data regarding the operation of the input/output device.

40 Claims, 5 Drawing Sheets

U.S. PATENT DOCUMENTS

| | | | |
|---|---|---|---|
| 5,047,959 A | 9/1991 | Phillips et al. | |
| 5,072,356 A | 12/1991 | Watt et al. | |
| 5,072,412 A | 12/1991 | Henderson, Jr. et al. | |
| 5,109,487 A | 4/1992 | Ohgomori et al. | |
| 5,122,948 A | 6/1992 | Zapolin | |
| 5,131,092 A | 7/1992 | Sackmann et al. | |
| 5,134,574 A | 7/1992 | Beaverstock et al. | |
| 5,151,896 A | 9/1992 | Bowman et al. | |
| 5,151,978 A | 9/1992 | Bronikowski | |
| 5,157,595 A | 10/1992 | Lovrenich | |
| 5,159,673 A | 10/1992 | Sackmann et al. | |
| 5,161,211 A | 11/1992 | Taguchi et al. | |
| 5,165,030 A | 11/1992 | Barker | |
| 5,179,700 A | 1/1993 | Aihara et al. | |
| 5,225,974 A | 7/1993 | Mathews et al. | |
| 5,245,704 A | 9/1993 | Weber et al. | |
| 5,251,302 A | 10/1993 | Weigl et al. | |
| 5,283,861 A | 2/1994 | Dangler et al. | |
| 5,297,257 A | 3/1994 | Struger et al. | |
| 5,307,463 A | 4/1994 | Hyatt et al. | |
| 5,321,829 A | 6/1994 | Zifferer | |
| 5,343,469 A | 8/1994 | Ohshima | |
| 5,349,675 A | 9/1994 | Fitzgerald et al. | |
| 5,386,524 A | 1/1995 | Lary et al. | |
| 5,398,336 A | 3/1995 | Tantry et al. | |
| 5,406,473 A | 4/1995 | Yoshikura et al. | |
| 5,420,977 A | 5/1995 | Sztipanovits et al. | |
| 5,430,730 A | 7/1995 | Sepulveda-Garese et al. | |
| 5,440,699 A | 8/1995 | Farrand et al. | |
| 5,446,868 A | 8/1995 | Gardea et al. | |
| 5,471,617 A | 11/1995 | Farrand et al. | |
| 5,528,503 A | 6/1996 | Moore et al. | |
| 5,598,536 A | 1/1997 | Slaughter, III et al. | |
| 5,611,059 A | 3/1997 | Benton et al. | |
| 5,613,115 A | 3/1997 | Gihl et al. | |
| 5,623,652 A | 4/1997 | Vora et al. | |
| 5,625,781 A | 4/1997 | Cline et al. | |
| 5,699,350 A | 12/1997 | Kraslavsky | |
| 5,734,831 A | 3/1998 | Sanders | |
| 5,793,954 A | 8/1998 | Baker et al. | |
| 5,805,442 A | 9/1998 | Crater et al. | |
| 5,862,391 A | 1/1999 | Salas et al. | |
| 5,889,785 A * | 3/1999 | Pesetski et al. | 371/20.2 |
| 5,950,006 A | 9/1999 | Crater et al. | |
| 5,982,362 A | 11/1999 | Crater et al. | |
| 5,997,167 A | 12/1999 | Crater et al. | |
| 6,016,523 A | 1/2000 | Zimmerman et al. | |
| 6,028,866 A | 2/2000 | Engel et al. | |
| 6,032,203 A | 2/2000 | Heidhues | |
| 6,058,251 A | 5/2000 | Okamoto et al. | |
| 6,061,603 A * | 5/2000 | Papadopoulos et al. | 700/83 |
| 6,061,721 A | 5/2000 | Ismael et al. | |
| 6,122,670 A | 9/2000 | Bennett et al. | |
| 6,151,625 A * | 11/2000 | Swales et al. | 709/218 |
| 6,151,640 A | 11/2000 | Buda et al. | |
| 6,263,487 B1 | 7/2001 | Stripf et al. | |
| 6,271,752 B1 * | 8/2001 | Vaios | 340/541 |
| 6,282,454 B1 * | 8/2001 | Papadopoulos et al. | 700/83 |
| 6,484,061 B2 * | 11/2002 | Papadopoulos et al. | 700/83 |
| 6,587,884 B1 * | 7/2003 | Papadopoulos et al. | 709/230 |

OTHER PUBLICATIONS

\*Abstract of "Process control takes to the Net," G. Paula; Mechanical Engineering, vol. 118, No. 12, p. 55, Dec., 1996.

\*Abstract of "Remote interrogation and control of sensors via the internet," Peter L. Furh and Euan F. Mowat; Sensors, vol. 12, No. 12, 6 pp; Dec. 1995.

\*Abstract of Implementation of CAN/CAN bridges in distributed environments and performance analysis of bridged CAN systems using SAE benchmark, H. Ekiz, A. Kutlu and E. T. Powner; Conference Paper, IEEE Southeastern '97, Engineering the new energy, IEEE, pp. 185–7, 1996.

\*Abstract of "Managing interdisciplinary project teams through the Web," R. E. Goodman and P. Chinowsky; Conference Paper, WebbNet 96—World Conference of the Web Society, pp. 180–185, 1996.

\*Abstract of "Learning environment for a process automation system using computer networks," J. Lindfors, L. Yliniemi and K. Leivska; Conference Paper, Step '96—Genes, Nets and Symbols, pp. 137–143, 1996 (Finland).

\*Abstract of "Distributed agent systems for intelligent manufacturing,"D. H. Norrie and B. R. Gaines; Canadian Artificial Intelligence, No. 40, pp. 31–3, Autumn 1996 (Canada).

\*Abstract of Proceedings of AUTOFACT 1995 Conference, "Today's Automated, Integrated Factory," Soc. Manuf., Eng., Dearborn, MI; 1995.

\*Abstract of "The ECOSSE Control HyperCourse," C. M. Merrick and J. W. Ponton; Computers & Chemical Engineering, vol. 20, Part B, pp. S 1353–8, 1996 (UK).

\*Abstract of "Chemical–better batch controls," T. Crowl; Control & Instrumentation, vol. 28, No. 5, pp. 53–4, May 1996 (UK).

\*Abstract of "Industrial software does 32–bit Windows, prepares for the net," W. Labs; I 8CS, vol. 69, No. 3, pp. 23–6, 31–4, Mar. 1996, USA.

\*Abstract of "A case study for international remote machining," G. C. I. Lin and Kao Yung–Chou; Conference Paper, Proc. SPIE–Int. Soc. Opt. Eng., vol. 2620, pp. 533–60, 1995.

\*Abstract of "Standardization of long–distance protocols," R. Dinges; Journal Paper, Generation Changes in Network Conductor Systems, ITG—Fachberichte, vol. 134, pp. 97–113, 1995 (West Germany).

\*Abstract of "Control system design V. Communications orchestrate process control," F. Glow; In Tech, vol. 36, No. 9, pp. 68–74, Sep. 1989.

\*Abstract of "Functions and characteristics of local networks adapted to industrial applications," J. Morlais; Electronique Industrielle, No. 97, pp. 56–63, Nov. 15, 1985; France.

\*Abstract of "Intelligent supervisory control of submerged–arc furnaces," Markus A. Reuter, Carla Pretorius, Chloe West, Peter Dixon and Morne Oosthuizen, JOM vol. 48, No. 12, Dec. 1996, pp. 49–51.

\*Abstract of "Simulation on the integration of process control systems of rolling mill plants through standard networks,"Choo Young Yeol, Hwang Hwa Won and Kim Cheeha, Proceedings of the Industrial Computing Conference, Instrument Society of America, Research Triangle Park, NC, USA. P 1–14; vol. 6, No. 1, 1996.

\*Abstract of "Environmental waste control digest," Clayton H. Billings; Public Works vol. 127 No. 7, 6 pp, Jun., 1996.

\*Abstract of "Experiments in tele–handling and tele–machining at the macro and micro scales, using the Internet for operational environment transmission," Mamoru Mitsuishi, Toshio Hori, Tomoharu Hikita, Masao Teratani, Takuro Watanabe, Hirofumi Nakanishi and Bruce Kramer; IEEE International Conference on Intelligent Robots and Systems vol. 2, 1995.

*Abstract of "A phototyping and reverse engineering system for mechanical parts–on–demand on the national network," Fred Hansen, Elias Pavlakos, Eric Hoffman, Takeo Kanade, Raj Reddy, Paul Wright; Journal of Manufacturing Systems, vol. 12 No. 4, pp. 269–281; 1993.
*Abstact of "Mathematical model and optimization of furfural treating process," Tao Peng, Jinshou Yu and Huihe Shao; Huadong Huagong Xueyuan Xuebao/Journal of East China Institute of Chemical Technology vol. 17 No. 1, pp. 99–104; Feb. 1991.
*Abstract of User's Aspect of Telecommunication and Information Processing in Plant Factory; Hashimoto Yasushi (1); Journal of the Institute of Electronics, Information and Communication Engineers, vol. 78, No. 5, pp. 475–81, Fig. 3, Ref. 7, 1995. (Japan).
*Abstract of "High–efficient application technology of DCS from the viewpoint of users," Oka Norihito (1); Narita Tsutomu (1); (1) Yamatake–Honeywell Co., Ltd.; Otomeshon, vol. 40, No. 2, pp. 24–28, Fig. 5, Part 2, 1995. (Japan).
*Abstract of "Users' experience with software tools for process integration. General results" Stougie, L.; Roeterink, H.J.H.; Van Wijk, A.; Stikkelman, R.M.; Nov. 1996.
*Abstract of "Integrated design and process technology. vol. 1" Cooke, D.; Kraemer, B.J.; Sheu, P.C.Y.; Tsai, J.P.; Mittermeir, R.; Society for Design and Process Science, pp. 51–57; 1996. (USA).
*Abstract of "Integrated design and process technology . vol. 2" Tanik, M.M.; Bastani, F.B.; Gibson, D.; Fielding, P.J.; Society for Design and Process Science, pp. 423–430, 1996. (USA).
*Abstract of "Integrated design and process technology. vol. 2" Tanik, M.M.; Bastani, F.B.; Gibson, D.; Fielding, P.J.; Society for Design and Process Science, pp. 306–312, 1996.
*Abstract of "Need low–cost networking consider DeviceNet," W. H. Moss; InTech vol. 43:11; pp. 30–31, Nov. 1996.
*"Plastic Car Bodies Pass the Crash Test" mechanical engineering vol. 118, No. 12; Dec. 1996.
*http://www.adeptscience.com/archive_pressroom/html/labtechnet.html; Adapt PressRoom Archives. A collection of Adept Scientific's archive news releases. "Hot Coffee on the Internet!".
*When Technology Standards Become Counterproductive, Kenneth C. Crater, President, Control Technology Corporation, Hopkinton, MA dated Jul. 9, 1999, pp. 1–5.
*A White Paper State Language for Machine Control, Kenneth C. Crater, President, Control Technology Corporation, Hopkinton, MA dated Jul. 9, 1999, pp. 1–11.
*New PC–based Process Control & Data Acquisition Software Integrates Remote Internet Capabilities with Fast Pentium Support, Fred A. Putnam, LABTECH President, pp. 1–3.
*Aug. 1996 CONTROL Magazine—In The News B Electric Utility Industry Embarks on Automation Overhaul, pp. 1–10.
*Jul. 1997 CONTROL Magazine B Magazine Software Review B NT Package Give Plant Access Through the Web, pp. 1–3.
*Oct. 1996 CONTROL Magazine B Software Review—Article Archives, pp. 1–2.
*ICS Instrumentation & Control Systems B Windows NT for real–time control: Which way to go?—ICS Magazine, pp. 1–8.

*I&CS Jul. 1999—Special Report Software—Software: Open source OSs, objects, Web–based communications challenge status quo, (Wayne Labs, Senior Technical Editor), pp. 24–49.
*Landis & Staefa MS 2000, pp. 1–2.
*Landis & Staefa Standards and Open Protocols Integration System Architecture, p. 1.
*Annabooks Bookstore, Programming and Interfacing the 8051, by Sencer Yeralan and Asutosh Ahluwalia, pp. 1–2.
*SoftPLC Corporation—Java Support in SoftPLC Corp. Products, pp. 1–5.
*Mach J. Company, MachJ, an embeddable, clean room Java Virtual Machine, p. 1.
*SoftPLC Corporation—The History of Programmable Controllers, Looking Back From the Year 2000 A.D. (Or, How Computers Replaced Proprietary PLC'S), pp. 1–7.
*SoftPLC Corporation—TOPDOC: Advanced PLC program development & documentation software, pp. 1–12.
*Control Engineering Online Magazine Articles (Jul. 1998)—No, that's not a PC, it's a PLC, pp. 1–2.
*Rockwell International Corporation, Allen–Bradley Introduces PLC–5/80E Controller for Ethernet Communication Networks, pp. 1–2.
*Rockwell Automation—Search Results, pp. 1–2.
*Rockwell International Corporation, Vision & Direction, The Direction of Automation Systems, pp. 1–4.
*Rockwell International Corporation, Vision & Direction, The Role of Open Systems, pp. 1–4.
*Rockwell International Corporation—Vision & Direction—The Direction of Automation Systems—Emergence of Application–Specific Control Solutions, pp. 1–2.
*Rockwell International Corporation—Vision & Direction—The Direction of Automation Systems—The New Factory Worker, pp. 1–2.
*Rockwell International Corporation, Vision & Direction, Control System Deliverables—The Next Step, pp. 1–2.
*Rockwell International Corporation, Vision & Direction, Conclusion & Acknowledgments, pp. 1–2.
*Rockwell International Corporation—Choices—Perspectives on the Future of Automation Control, p. 1.
*Rockwell International Corporation—Allen–Bradley—Networks—Ethernet for Industrial Control—An Ethernet White Paper—Apr. 21, 1998, pp. 1–13.
*Rockwell International Corporation—Automation Systems Control—General—World– Class Automation Systems from Allen–Bradley, Last Updated: May 7, 1998, pp. 1–12.
*PC QUEST, Dec. >97—Point, click, Control—C–Programmable controllers take the pain out of embedded control, pp. 1–2.
*Berthel—automation with imagination—PCI 100—Programmable logic controller for SIMATIC/IBM IPC, pp. 1–3.
*Yahoo! Personalized Search Results for programmable logic controller internet access, pp. 1–3.
*SIEMENS—SIMATIC report 1/97—New in the SIMATIC Library, pp. 1–2.
*CONTROL Magazine Aug. 1998 B Field Test—Dynamic Software Makes Control Integration Easier, pp. 1–2.
*Design and Reuse Web Site—EDTN Network—Analyze IP Database Content—Analyze Reuse Blocks per taxonomy tree, pp. 1–10.
*Engineering Information, Inc.—Ei CPX WEB [1990–94].
*Using World Wide Web for Control Systems, F. Momal, C. Pinto–Pereira, AT Division CERN, 1211 Geneva 23, http://mish231.cern.ch/Docs/ICALEPCS/1995/icalep95.htm.

*"Ethernet Base Gateway Product," AEG–Modicon, published 1991.
*"Modicon Modbus Plus Network BM85 Bridge Multiplexer User's Guide," Groupe Schneider, Aug. 1995.
*"Modicon Modbus Plus Network Planning and Installation Guide," AEG Schneider Automation, Apr. 1996.
*"Open Modbus/TCP Specification," A. Swales, Sep. 3, 1997.
*"MEB Installation and Programming Manual," Niobrara Research and Development Corporation, Sep. 24, 1997.
*"MEB–TCP Installation and Programming Manual," Niobrara Research and Development Corporation, Oct. 1, 1997.
*"Internet Protocol, Darpa Internet Program, Protocol Specification—RFC:791," Defense Advanced Research Projects Agency, Sep. 1981.
*"Transmission Control Protocol, Darpa Internet Program, Protocol Specification—RFC:793," Defense Advanced Research Projects Agency, Sep. 1981.
*"[comp.unix.programmer] Unix–Socket–FAQ For Network Programming," Vic Metcalfe, Andrew Gierth and other contributors, Jan. 22, 1998.
*"TCP/IP Illustrated, vol. 2, The Implementation," Gary R. Wright, W. Richard Stevens, 1997.
*"Winsock 2 Information," Bob Quinn, 1995–1998 (last updated Dec. 5, 1998).
*Website Information of PROFIBUS: Technical Overview.
*Website Information of ODVA—The Open DeviceNet's Vendor Association.
*Website of PROFIBUS International—Welcome Page.
*LabVIEW Graphical Programming for Instrumentation, Networking Reference Manual, 8 Copyright 1993, 1994 National Instruments Corporation, Part No. 320587B–01, Sep. 1994.
*LabVIEW Graphical Programming for Instrumentation, Tutorial for Windows, 8 Copyright 1993, 1994 National Instruments Corporation, Part No. 320593B–01, Sep. 1994.
*LabVIEW Graphical Programming for Instrumentation, Data Acquisition VI Reference Manual for Windows, 8 Copyright 1992, 1994 National Instruments Corporation, Part No. 320536B–01, Sep. 1994.
RFC 1533 "DHCP Options and BOOTP Vendor Extensions," (http://ietf.org/rfc/rfc1533.txt) IETF, Oct. 1993.
RFC 1534 "Interoperation between DHCP and BOOTP," (http://ietf.org/rfc/rfc/1534.txt) IETF, Oct. 1993.
RFC 2131 "Dynamic Host Configuration Protocol" (http://ietf.org/rfc/rfc21231.txt) IETF, Mar. 1997.
SOAP, Simple Object Access Protocol (1.1) W3C Note May 8, 2000, (http://www.w3.org/TR/2000/NOTE-SOAP-20000508).
*Statement of Ken Crater pertaining to awareness of LABTECHnet technology, 1 page.
Walid Mostafa, Mukesh Singhal, "*A Taxonomy of Mulicast Protocols For Internet Applications,*" Jul. 18, 1997 from Computer Communications 20 (1998) 1448–1457.
*Tiloo Klesper, "Der Internet–Zugriff aufs LON,"* Aug. 1998 from Automatisieren.

*David J. Preston, "Internet Protocols Migrate to Silicon For Networking Devices"* from Electronic Design, Apr. 14, 1997.
IEEE Std 802.11a–1999 (Supplement to IEEE Std 802.11–1999) "Part 11: Wireless LAN Medium Access Control (MAC) and Physical Layer (PHY) specifications Higher–speed Physical Layer in the 5 GHz Band" [Adopted by ISO/IEC and redesignated as ISO/IEC 8802–11:1999/Amd 1:2000(E)].
P802.1p/D4 Sep. 6, 1966 "P802.1p Standard for Local and Metropolitan Area Networks—Supplemental to Media Access Control (MAC) Bridges: Traffic Class Expediting and Dynamic Multicast Filtering".
SOAP, [online], [retrieved on Aug. 5, 2002]. Retrieved from MSDN Online—Default Home Page using Internet <URL:http://msdn.miscrosoft.com/nhp/ default.asp?contentid=28000523&frame= true>.
PROCOMM Plus—The Leader in terminal emulation, [online], [retrieved on Jan. 13, 2002]. Retrieved from the consumer web page of Symantec, Inc. using Internet <URL:http://www.symantec.com/procomm>.
DEC Terminals—The DEC VT100 and Its Successors, [online], 1999 Richard Shuford, [retrieved on Jan. 13, 2002]. Retrieved from DEC Video Terminals—The VT100 and Its Successors using Internet <URL:http: //www.cs.utk.edu/~shuford/terminal/dec.html>.
Skonnard, Aaron, SOAP: The Simple Object Access Protocol, [online], [retrieved on Jul. 30, 2002]. Retrieved from SOAP: The Simple Object Access Protocol—MIND Jan. 2000 using Internet <URL: http://www.microsoft.com/Mind/0100/soap/soap.asp>.
Extensible Markup language (XML)—W3C Working Draft Aug. 7, 1997, [online], [retrieved on Aug. 1, 2002]. Retrieved from Extensible Markup Language (XML) website using Internet <URL:http://www.w3.org/TR/WD–xml–970807.htm>.
Multi–Tech Systems Granted Modem Firmware Upgrade Patent, Apr. 5, 2000, [online], [retrieved on Jan. 3, 2002]. Retrieved from Multi–Tech Press Release using Internet <URL:http://www.multitech.com/NEWS/releases/2000/183.html>.
NetReach™ Model TPS–2, TelnetPower Switch 2001, [online], [retrieved on Jan. 13, 2002]. Retrieved from Model TPS–2 Telnet + Dial–Up Remote Power Manager, Remote Reboot of Servers, Route . . . using Internet <URL:http://www.wti.com/tps2.htm>.
ANSI.SYS, [online], [retrieved on Jan. 13, 2002]. Retrieved from ANSI.SYS—ansi terminal emulation escape sequences using Internet URL:http://enterprise.aacc.cc.md.us/~rhs/ansi.html>.
Remote Interrogation and Control of Sensors via the Internet, Sensors and Systems; Peter L. Fuhr and Euan F. Mowat; University of Vermont; pp. 25–30; Dec. 1999.

* cited by examiner

WEB INTERFACE TO AN INPUT/OUTPUT DEVICE

RELATED APPLICATIONS

This application is a continuation-in-part of U.S. patent application Ser. No. 08/927,005 filed on Sep. 10, 1997, entitled "Web Interface To A Programmable Controller," This application is also related to the following, commonly assigned applications entitled, "Messaging Application Layer (MODBUS) Over Ethernet To Transport Layer (TCP) Communications Method and Apparatus For A Modular Terminal Input/Output System," U.S. patent application Ser. No. 09/166,870, filed Oct. 6, 1998; "Web Interface To A Programmable Controller," U.S. patent application Ser. No. 09/303,458, filed Apr. 30, 1999; "Interface To A Programmable Logic Controller," U.S. patent application Ser. No. 09/223,349, filed Dec. 30, 1998; and "Communications System For A Control System Over Ethernet And IP Networks And Communication Interfaces For Such Systems," U.S. Provisional Patent Application 60/078,223, filed Mar. 16, 1998. The contents of these Applications are expressly incorporated herein by reference.

TECHNICAL FIELD

The present invention relates generally to the field of monitoring and controlling input/output modules or devices for a factory automation system. More particularly, the present invention relates to a system for coupling input/output modules or devices to a web server.

BACKGROUND OF THE INVENTION

Remote monitoring and control of systems, processes and I/O devices has taken many forms. In the past, dedicated lines were the common form of communication between a control system and a remote location. This type of communication had limited application since the control system was not accessible from multiple locations. Modems have made it possible to access the control system from different locations, but these types of systems are generally restricted to downloading and uploading data files. Providing any type of control function between locations is rather limited in this type of environment. Furthermore, a customized interface is generally required to access the control system by an end user.

With the growth of Internet, and its World Wide Web providing a delivery platform for organizing Internet data through hypertext links, a client server system can be designed that will give each end user the same type of user friendly interface and universal access to services on the Web. The Web is a network of documents called sites or pages stored on server computers throughout the world. Each page typically contains text, multimedia offerings, i.e., graphic images, video, or audio; and hypertext links to other web pages or documents. A browser allows a user to read and interact with the web page. The browser is a graphical software program that sends commands to the Internet Web site and displays whatever information is available on the page. Various browser programs are commercially available from different manufacturers, as is well known.

The Internet network employs methods designed to handle thousands of general purpose computers sharing a single cable, and therefore has no ability to differentiate traffic in terms of its purpose or the criticality of its data. The Internet is no longer a network of computers sharing a single cable, but rather a web of interconnected point to point links involving both general purpose stations and specialized infrastructure components such as routers and firewalls.

Most personal computers or work stations can be used by the end user to connect to the Web through the commercially available browsers. Communication over the Internet and other networks requires one of several available protocols. Protocols such as Internet Protocol (IP) provide for file transfers, electronic mail, and other services. Commercially available programming languages such as Java, along with Hypertext Markup Language (HTML), are used in designing layouts and graphics for a web site or page and have extended Internet technology such that a web site can be used for dynamic applications, e.g. applets, that can be downloaded and run by the end user. These applets are interpreted and run within a Web browser and have been generally restricted to word processing and similar uses. Downloading and running applets can be slow in comparison to other types of compiled languages. Security rules imposed on a browser and enforced by the underlying JAVA language prevent applets from obtaining certain data from any other device other than the Web server itself.

Programmable logic controllers (PLCs) are widely used in industry and process control. Many manufacturers provide factory automation information using Microsoft Windows and other types of communication networking environments. These networks are usually slow, not universally accessible, and are limited to monitoring and data exchange. Specialized industrial networks using proprietary fieldbus alternatives can be very expensive. Conversion products are required to allow information carried over those networks to be visible on a general purpose network. There are significant installation and other deployment costs associated with the existence of such intermediate devices. Firewalls between the Web server and the application are designed to solve problems of security and are not designed for high performance.

One type of interface to a programmable logic controller is disclosed in U.S. Pat. No. 5,805,442 to Crater, et al. This patent provides one or more controllers each equipped to perform a control function and to gather data (ordinarily from sensors) relevant to the control function. Each controller contains computer storage means, such as computer memory, for storing the relevant data and instructions, associated with the data, for causing a remote computer to generate a visual display incorporating the data in a predetermined format. The additional time required to transfer data through a programmable logic controller to the monitoring PC decreases the value of the information being monitored. In addition, the monitoring and control of the system's input/output devices by the remote PC is available only through the use of a programmable logic controller positioned between the monitoring PC and the devices. The real-time delay associated with the integrated PLC contributes to increased network communication traffic and slower updates of network information. Direct connection to the I/O device is beneficial for maintenance, repair, debugging and diagnosing problems, particularly during the installation of factory automation systems and machines.

It would be desirable to develop an automation control system whereby a user could use general purpose networks, such as the Internet and specialized industrial networks, directly connected to input/output devices for remote monitoring and control of input/output modules or devices.

This invention is designed to solve these and other problems.

SUMMARY OF THE INVENTION

Accordingly, the principal object of the present invention is to provide an interface between an industrial control system and a Web browser coupled to a network such as the Internet.

Another object of the present invention is to provide remote access through a web browser to information and data contained in an input/output (I/O) device.

In the preferred embodiment of the invention, the invention allows for easy access over a commercial network such as the Internet to information within at least one input/output device. Access can be made locally or worldwide using a commercial Web browser. The invention is comprised of a control system of essential elements including, but not limited to a Web interface, a local network, and a network interface to at least one input/output device. The Web interface runs Web pages from an Ethernet board coupled directly to the input/output back plane and includes a hypertext transfer protocol (HTTP) interpreter, an input/output module back plane driver, a Transmission Control Protocol/Internet Protocol (TCP/IP) stack, and an Ethernet board kernel. The Web interface provides access to the input/output device back plane by a user at a remote location through the Internet. The interface translates the industry standard Ethernet, TCP/IP and HTTP protocols used on the Internet into data recognizable to the input/output device. Using this interface, the user can retrieve all pertinent data regarding the operation of the input/output device, including input/output device configuration, input/output status, operating statistics, diagnostics, and distributed input/output configurations. Updates to operating software can also be downloaded through the Internet access.

Other features and advantages of the invention, which are believed to be novel and nonobvious, will be apparent from the following specification taken in conjunction with the accompanying drawings in which there is shown a preferred embodiment of the invention. Reference is made to the claims for interpreting the full scope of the invention which is not necessarily represented by such embodiment.

DETAILED DESCRIPTION

Although this invention is susceptible to embodiments of many different forms, a preferred embodiment will be described and illustrated in detail herein. The present disclosure exemplifies the principles of the invention and is not to be considered a limit to the broader aspects of the invention to the particular embodiment as described.

Figure 1:
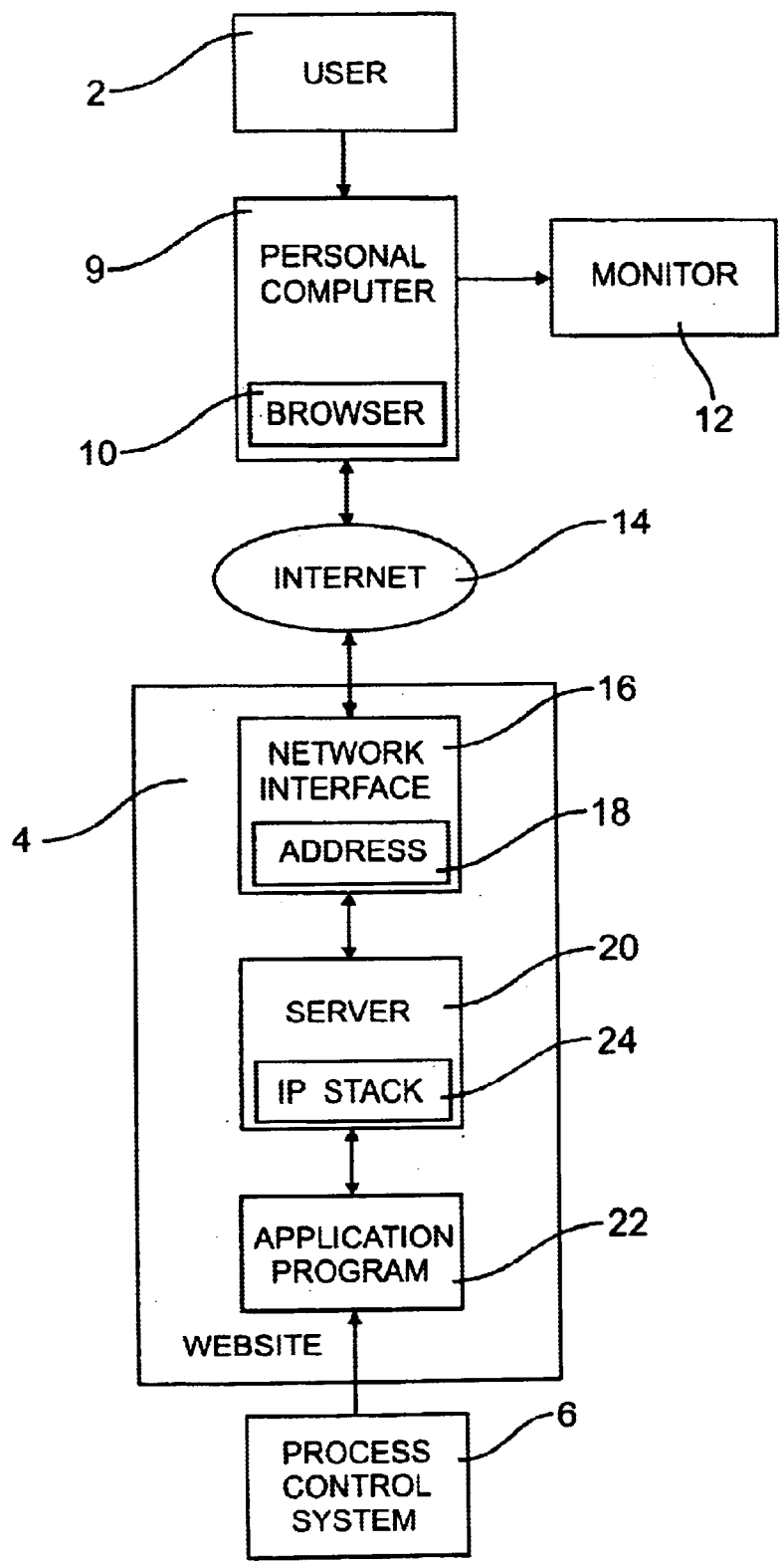
FIG. 1 shows an overview block diagram of a typical system illustrating the relationship between a user at a remote location and an Internet Web site used for monitoring a process control system according to the present invention.

FIG. 1 shows an overview block diagram of typical system illustrating the relationship between a user 2 at a remote location and an Internet web site 4 used for monitoring a process control system 6. The user 2 will have a personal computer (PC) 8 having a commercially available browser 10, such as Netscape Communication's Navigator or Microsoft's Internet Explorer, installed for viewing the contents at the web site 4 by a monitor 12 through a network, such as the Internet 14. The PC provides a remote human-machine interface (HMI) to the process control system 6. Various interconnection services are readily available to provide the physical and electrical interconnection from the PC 8 to the Internet 14 itself. The Internet 14 is a collection of independent world wide communication networks that are interconnected to each other and function as a single connectionless entity. Communication is based on a client-server basis, using a number of established protocols that allow for communication and file transfers between the client and the server. One of the most widely used protocols is Internet Protocol (IP). The applications layer protocol interface to the web browser is typically through the HTTP protocol using the HTML or JAVA language.

The web site 4 includes a network interface 16 having an unique Internet address 18, a server 20, and the Input/Output System Executive Firmware 22. The server 20 acts as a hypertext transfer protocol (HTTP) interpreter which uses Transmission Control Protocol (TCP) in conjunction with Internet Protocol, through a Transmission Control Protocol/Internet Protocol (TCP/IP) stack 24 to interact with the network interface 16 and the Input/Output System Executive Firmware 22. This enables the data transfer between the application program 22 and the user 2 through the Internet 14. The Input/Output System Executive Firmware 22 provides data from the process control system 6. This data can be used to monitor the control process by the user 2 at the remote location. The TCP/IP stack 24 enables data transfers over the Internet 14 between the user 2 and the web site 4 as required for the various layers specified by the IP protocol.

The user 2 can connect to the Internet 14 using one of a number of Internet service providers and will enter the address of the web site 4 when connected. The web site 4 will display a home page which may contain text, some type of multimedia offerings such as graphic images, video, or audio, and possible hypertext links to other web sites or documents. Trouble shooting instructions, maintenance logs, repair diagnostic information, quality control parameters, etc., reside within the web site 4 for convenient access by a user. The browser 10 will allow the user 2 to read and interact with the page. The browser 10 will send commands to the web site 4 which will use the Input/Output System Executive Firmware 22 to display whatever information is available from the process control system 6. The browser 10 functions as a remote human-machine interface (HMI) control of the process control system 6 as will be detailed below.

Figure 2:
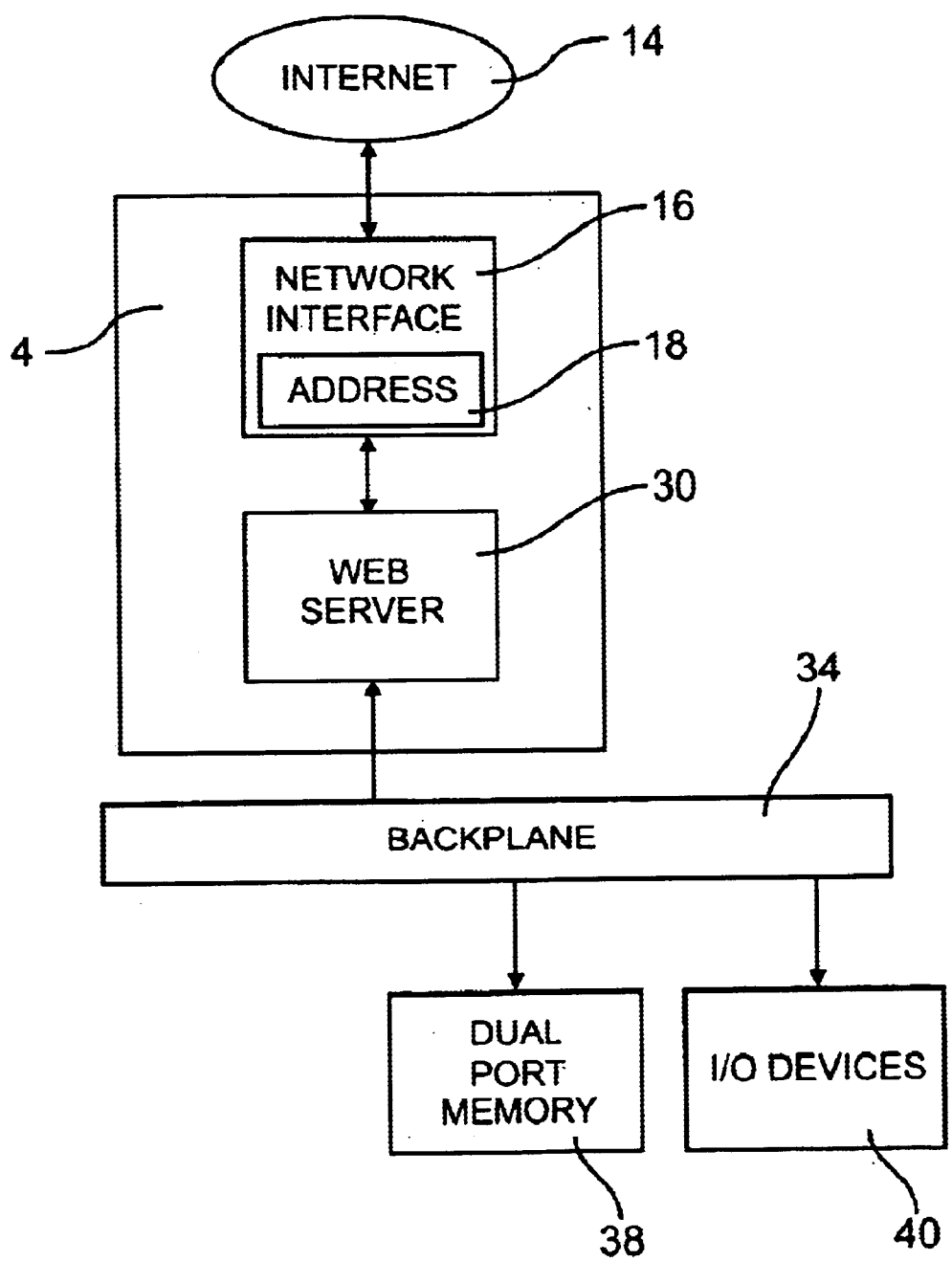
FIG. 2 is a basic block diagram of the present invention illustrating an Internet interface to an input/output device.

FIG. 2 shows a basic block diagram of the present invention illustrating the Internet interface to an input/output device 40. The web site 4 includes the network interface 16 having an unique Internet address 18 and a web server 30. The web server 30 provides the home page for the website. A Security for the overall system can be included in the web server 30, but is generally maintained as part of the network interface 16. In addition to providing security for various pages at the site, the user can disable the web server 30. A password and user list are provided in initial configuration files stored in the web server 30 that are downloaded from a remote server. Protection of the configuration file is then provided by the remote server and the web server 30 through the password and the user list. The web server 30 provides a direct connection for an input/output device 40 to the Internet 14 by plugging the web server 30 into the input/output device 40 through the back plane 34.

The input/output device 40 includes any device having a communication input and/or output capable of interfacing with the web server 30 or other devices. The I/O device 40 includes devices such as sensors, relays, gauges, valves, message displays, switches, limit switches, proximity switches, motor starters, motor controllers and any other like device as well as traditional I/O modules for PLC systems. The web server 30 provides both a client and server interface. All signals between the I/O device 40 and the web server 30 are through the back plane 34. The back plane signals include addressing, control, data, and power. The client interface allows an Input/Output module to send commands to a remote node over the Internet and the server interface allows for processing commands that originated from a remote node. Near real time control of the I/O device 40 from a remote HMI is possible by controlling the data flow through the web server 30.

Figure 4:
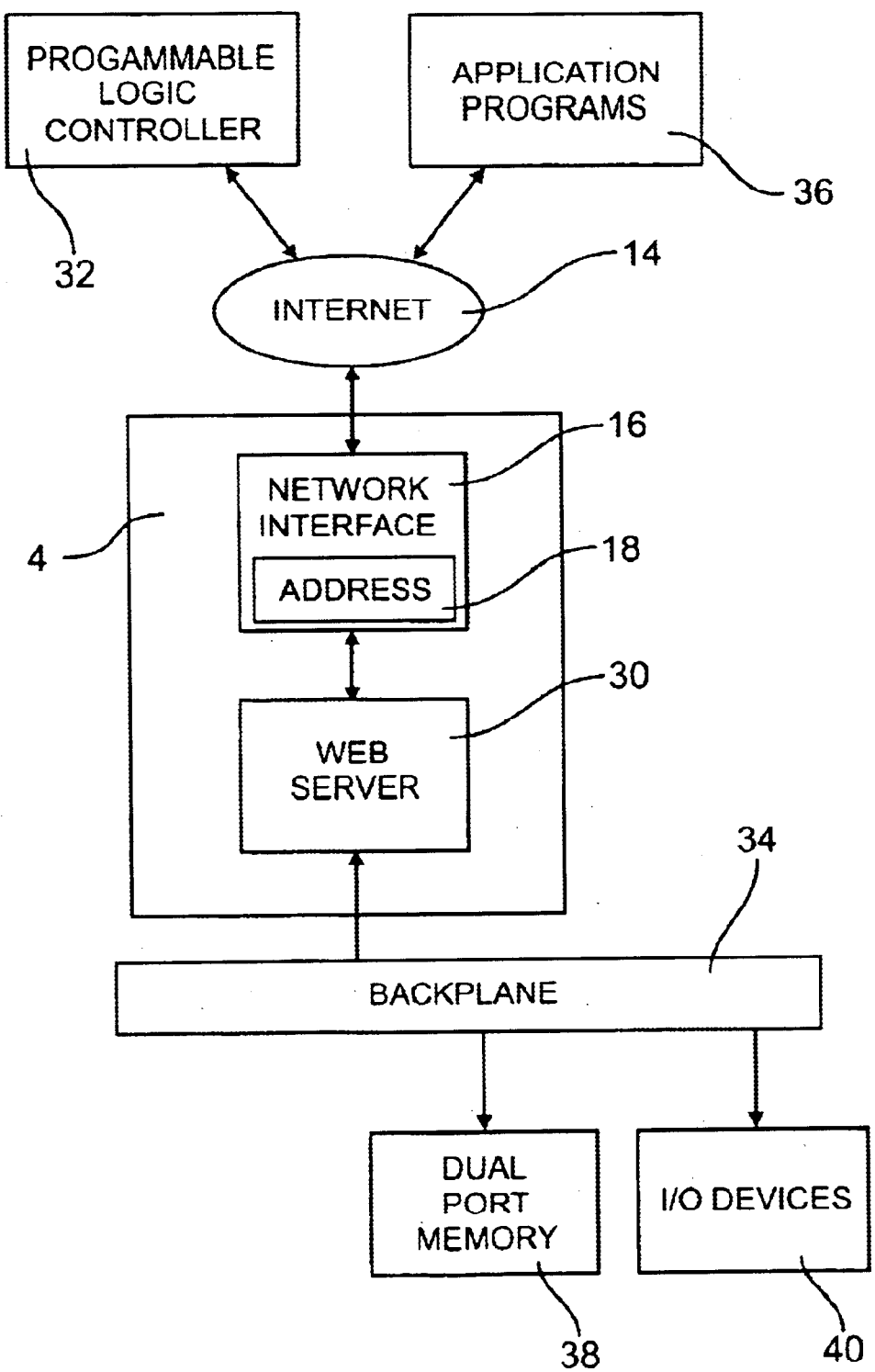
FIG. 4 is an alternative block diagram of the present invention shown in FIG. 2 further including a programmable logic controller and an application program connected to the Internet.
Figure 6:
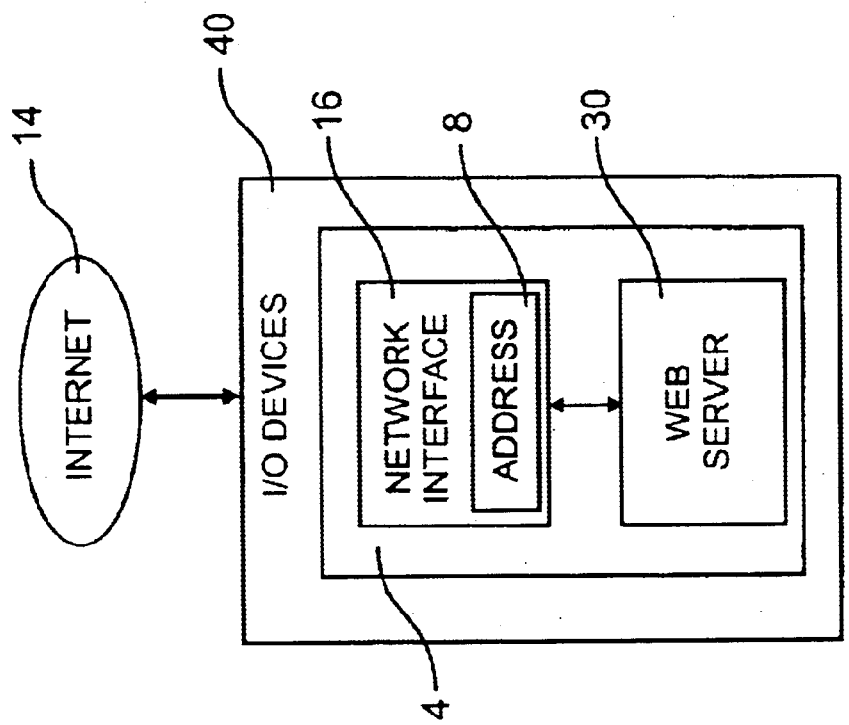
Figure 5:
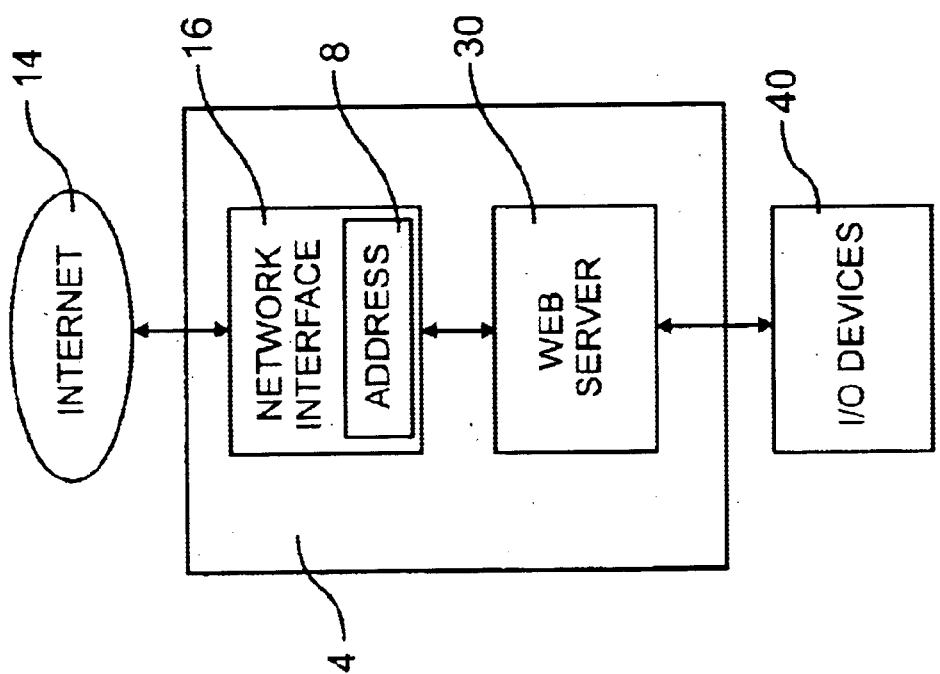
FIG. 5 is an alternative block diagram of the present invention shown in FIG. 2; and, FIG. 6 is an alternative block diagram of the present invention shown in FIG. 2.

FIG. 4 depicts at least one PLC 32 and application program 36 interconnected within the process control system via the Internet 14. FIG. 5 depicts an alternative embodiment of the present invention wherein the I/O device 40 is interconnected directly to the web server 30. Another alternative embodiment of the present invention is shown in FIG. 6 wherein an I/O device 40 has an embedded interface capable of interconnecting with the Internet 14.

The web server 30 functions as a node on a TCP/IP network 42 allowing it to send commands to the I/O device 40 and receive the responses. Although the TCP/IP network 42 in the preferred embodiment is an Ethernet network, other high level protocols could be used. A user can control and view configuration information of the I/O device 40 through the Internet 14 by using a web browser 10 at a remote location.

Figure 3:
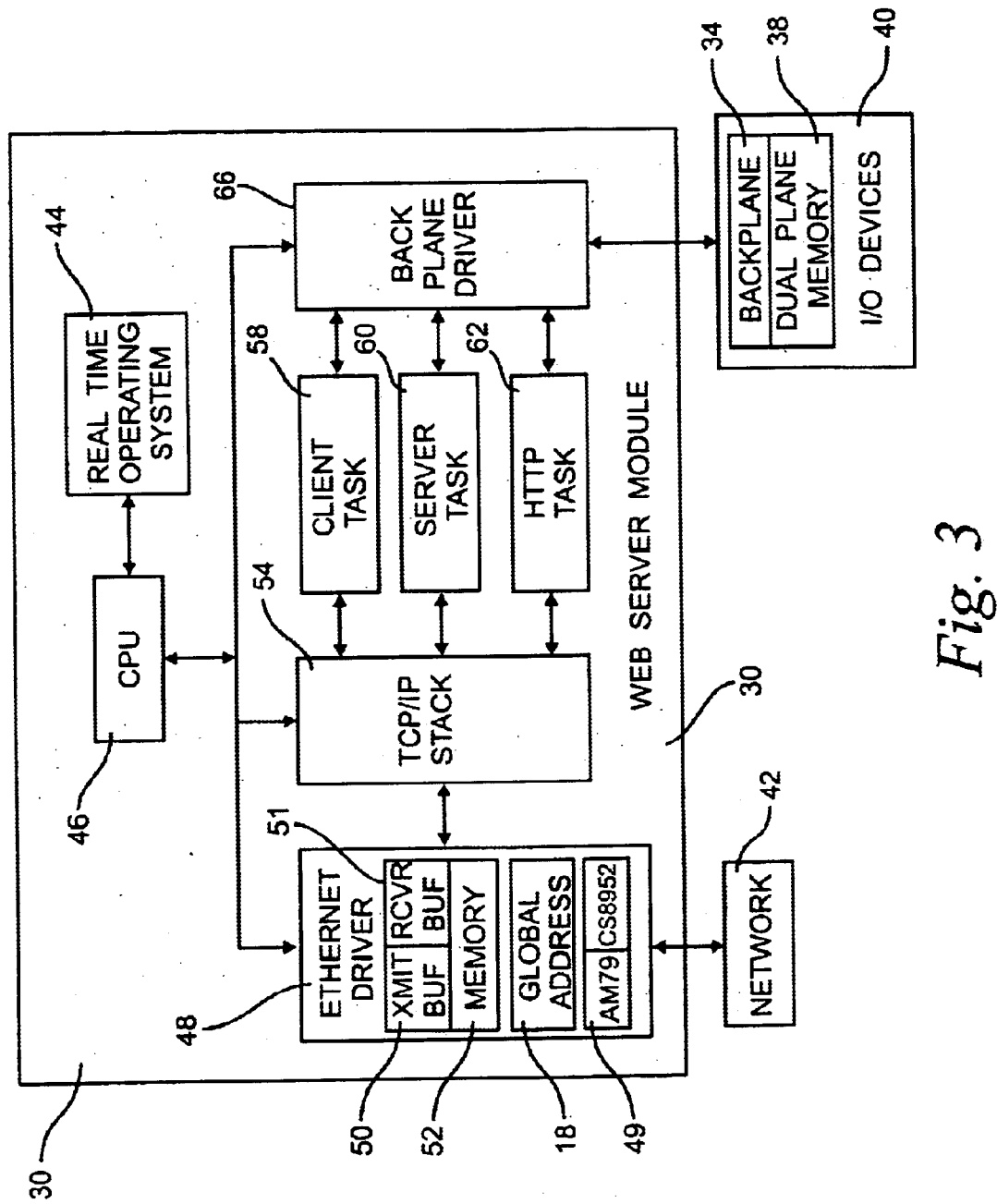
FIG. 3 is a block diagram of the web server module illustrated in FIG. 2 according to the present invention.

The web server 30 is shown in greater detail in FIG. 3. Various components provide the required connectivity to perform its functionality. A real time operating system 44 controls the interaction between the components. The operating system 44 allocates processor time on a central processor unit (CPU) 46 to various tasks, provides memory management, and provides a set of message services and signal services. The message and signal services allow for communication between tasks, and between drivers and a task.

Connection to the TCP/IP network 42 is through an Ethernet driver 48 which transmits and receives messages at a rate of 10 Mbs (megabits per second) or faster via an Ethernet communication chip 49, such as, in the case of 100 Mbs Ethernet, a Crystal CS8952 available from Cirrus Logic, Inc. It is contemplated that in the future, Ethernet communication chips capable of speeds of 1 Gbs (gigabits per second) and faster can be used. The physical connection over which communication is facilitated can be over a fiber optic cable or a twisted pair-type copper wire. In the case of 100 Mbs Ethernet over twisted pair-type copper wire, the copper wire and wire connections must conform to at least the Category 5 copper wire standard.

Alternatively, the TCP/IP stack 24 can be replaced by a dual TCP/IP stack. The dual TCP/IP stack comprises a first TCP/IP stack which provides support for a broad range of TCP/IP messages. The second TCP/IP stack is a "short stack" which manages high priority control messages to the I/O device 40. For outgoing TCP/IP messages, the appropriate TCP/IP stack would be chosen by an I/O device 40. For incoming TCP/IP messages, the TCP/IP message would be intercepted and examined to determine if it is a TCP/IP message that is intended for the Modbus on Ethernet protocol. If it is a TCP/IP message intended for the Modbus on Ethernet protocol, the message is then delivered to the second stack. If it is not a TCP/IP message intended for the Modbus on Ethernet protocol, the first TCP/IP stack handles the message. In this manner, TCP/IP messages intended for the Modbus on Ethernet protocol are handled more quickly and efficiently than when a single TCP/IP stack is implemented.

The web server will have an unique global address 18, allowing it to be addressed by other devices on the network. The Ethernet driver 48 manages transmit 50 and receive 51 buffers in memory 52, and interfaces with the Ethernet communication chip 49. The transmit 50 and receive 51 buffers are shared both by the Ethernet communication chip 49 and the Ethernet driver 48. The Ethernet driver 48 also provides a transmit request interface and a receive indication interface to a TCP/IP stack 54. The Ethernet communication chip 49 provides a transmit queue interface, a receive queue interface, and generates interrupts on completion of transmitting a message, and on receiving a new message. The Ethernet driver 46 places receive buffers in the receive queue. In the interrupt routine, the Ethernet driver 46 examines the receive queue. If any messages are in the receive queue, it passes the receive buffer to the TCP/IP stack 54. The TCP/IP stack 54 copies the buffer, and sometime later, calls the Ethernet driver 48 to return the buffer and place the returned buffer back into the receive queue.

The TCP/IP stack 54 calls the Ethernet driver 48 to transmit a message. The Ethernet driver 48 attempts to allocate a buffer from the shared memory 52. If it succeeds, it copies the message into the buffer, and places the buffer into the Ethernet communication chip 49 transmit queue. If there is no transmit buffer, then the driver drops the transmit message. In the interrupt routine, the Ethernet driver 48 examines the transmit queue, and frees the transmitted buffers.

The TCP/IP network 42 allows a PLC (or other device) to request to read or write data from the I/O module 40 and to receive the responses. A back plane driver 56 sends commands and receives the response from the I/O device 40 over the back plane 34. The back plane driver 56 provides a server task 60 to the applications. The server task 60 interface allows an application to issue a request command to the I/O device 40 and receive its response.

The server task 60 uses a queuing mechanism and call back functions. Both the request and the call back function associated with the request are queued. When the back plane driver 56 services the request in its interrupt routine, it calls the associated call back function. The response and the original request is passed to the call back function. The call back function can call an operating routine to either pass a message or a signal.

The web server 30 hardware interfaces with the I/O device 40 via the dual port memory 38. It reads and writes to the dual port memory 38 using an ASIC chip. Writing to a specified location will cause an interrupt. The I/O device 40 first writes a message in the dual port memory 38, and then causes an interrupt. The message indicates a type of command. Other command types are used for passing requests to the I/O device 40 and obtaining the responses to the requests. After the I/O device 40 passes the message, it polls the dual port memory 38 for commands placed by the back plane driver 56. These commands are read memory, write memory, and processing is complete.

Two interrupts are used for processing a request. On the first interrupt, called the preport interrupt, the back plane driver 56 copies the request into a data structure located in the I/O device's dual memory 38. On the second interrupt, called the end of scan interrupt, the back plane driver 56 copies the response from the I/O module's data structure into the user's buffer. It then calls the user's associated call back function.

The request for accessing the I/O device's 40 data is processed by the back plane driver 56. The Ethernet driver board functions as a master and the I/O device 40 functions as a slave. The back plane driver 56 determines the memory location in the memory 38 of the I/O device 40. At an end of scan interrupt, the back plane driver 56 processes the read/write data requests by sending commands via the dual port memory 38 to the I/O device 40 to read or write the locations containing the data.

The server task 60 processes a request originating from the user at the remote location. The server task 60 interfaces with the back plane driver 56, the TCP/IP stack 54, and the operating system's 44 message services. The server task 60 posts requests to the back plane driver 56, and an associated call back routine uses the operating system 44 message services to send the response to the server task 60. A TCP/IP stack 54 signal function also uses the operating system's 44 send service to send a TCP/IP event to the server task 60. The server task 60 can handle multiple transactions and connections. Like the client task 58, the server task 60 maintains a list of connection state machines, and each connection state machine contains a list of transaction state machines. The connection state machines are for managing the connection and the transaction state machines manage the incoming requests and responses.

The server task 60 enters a loop after performing initialization and calls the operating system 44 to receive a message. The operating system 44 blocks the server task 60 until there is a message or there is a time out. It either receives a message from the TCP/IP task's 54 signal handler, from the back plane driver 56 or it times out. It processes the message or the time and reenters the loop. If the message received from the operating systems 44 is from the TCP/IP task's 54 signal handler, the server task 60 determines if the event is a connection request, a close socket event, or a receive data event. Based on the TCP/IP event, the server task 60 uses the connection state machine and transaction state machine to advance the transaction. Received data for a request may occur over several receive data events, and the transaction state machine assembles the events into a request message. When the response message is received from the operating system 44, the server task 60 finds the connection and transaction state machines in order to send the response.

When the server task 60 requests the TCP/IP stack 54 to transmit a message, not all of the message may be transmitted. This occurs when the remote node is flow controlled. If the call to the operating system 44 is to receive a message returns with a time out, or if there is a message, the server task 54 searches the list of connection state machines that are flowed controlled. For each flow controlled connection, it tries to advance the transaction state machines on the connection state machine list that are flow controlled.

After the server task 60 has parsed the header of an incoming request, it attempts to allocate a structure to pass the request to the back plane driver 56. If the server task 60 is already processing a predetermined number of outstanding requests, the attempt fails, the connection is placed into a blocked state, and the body of the request is not read from the TCP/IP stack 54. As a result the TCP/IP stack may apply flow control to the remote node. When one of the other requests is complete, the free data structure event causes a blocked connection state machine to continue processing the incoming Modbus request.

The HTTP task 62 interfaces with the TCP/IP stack 54, and the back plane driver 56. The HTTP server task 62 receives a HTTP request from the TCP/IP stack 54. To process the request, it may access the I/O device 40 through the back plane driver 56 and back plane 34. The HTTP server task 62 sends back the response over the TCP/IP stack 54. The framework is supplied by the operating system 44. The framework creates the HTTP task, accepts connection, and parses the HTTP request. After parsing the request, it calls the operating system 44 to process the request. Processing the request involves determining the request type and processing the actual request. The different request types allow a user to acquire a snapshot of the I/O device 40 operations by allowing a view of various data within the I/O device 40 and dual memory 38. These request types also include display of the I/O device 40 configuration, remote and distributed I/O and module health statistics, display registers, back plane configuration, Ethernet statistics and others, as shown in Table 1:

TABLE 1

Show the home page
Show the Ethernet statistics
Show the read register request page
Show the I/O modules attached to the Web Server board back plane
Send an image. The different images are gif files that are displayed on the various pages
Show the I/O module statistics
Show a remote I/O rack's configuration and health
Show a remote I/O drop's communication statistics
Show the I/O reference values of an I/O module The home page contains hyperlinks to several pages of data. The configuration page will display the configuration of I/O device 40. The I/O module health status pages are a series of linked pages. The first page displays the communication health statistics at the head and contains a link to a configured drop page. The configured drop page displays two tables, one for showing the communication status of the drop and the other for showing the I/O modules 40. The configuration page displays the I/O modules 40, their health, and slot location for the given rack. From a selected I/O module 40, a user can view its input and output values. A table showing option modules and their slot location is displayed on the back plane configuration page. The data appearing on the pages is static and dynamic, depending upon the user's needs.

The operating system 44 processes these requests and responds by sending HTTP messages through the TCP/IP stack 54. Processing some of these requests involves reading data or memory locations where statistics are kept. To perform these reads, the operating system 44 sends a request to the back plane driver 56 and uses an event signal mechanism and event flags to determine when the request is complete. After sending the request to the back plane driver 56, the operating system 44 waits for an event flag to be sent. When the back plane driver completes the request, the back plane driver 56 calls a call back routine, which sets the event. The operating system 44 then resumes processing the request.

A user at a remote location will browse the Internet for the home page of the installation of the I/O device 40. The I/O device 40 may have other control functions as well and if the user has the necessary authorizations, various options will become available. The home page will allow the user to acquire a snapshot of the I/O device 40 operations by allowing a view of various pages that will allow access to data within the I/O device 40. Other pages will also include displays of the I/O device's 40 configuration, remote and distributed I/O modules health statistics, back plane configuration, Ethernet statistics and others as shown previously shown in Table 1.

While the specific embodiments have been illustrated and described, numerous modifications are possible without departing from the scope or spirit of the invention.

We claim:

1. An interface module for receiving data requests from a remote location in order to provide access to an at least one input/output device from a communication network, the module comprising:
    a central processing unit;
    an operating system operating the central processing unit;
    a network interface for communicating with the communication network;
    a protocol stack;
    a server task for communicating with the protocol stack for responding to received requests; and
    a protocol task for communicating with the protocol stack for receiving and responding to protocol task requests.

2. The interface module of claim 1 further including a back plane driver for communicating with the protocol task and the server task.

3. The interface module of claim 1 wherein the communication network is the Internet using an Internet Protocol (IP).

4. The interface module of claim 3 wherein the interface module functions as a web site on the Internet, the interface module including a global IP address.

5. The interface module of claim 1 wherein the network interface is an Ethernet driver.

6. The interface module of claim 1 wherein the protocol stack is a Transmission Control Protocol stack.

7. The interface module of claim 1 wherein the protocol task includes a server task using a hypertext transport protocol (HTTP) to deliver hypertext documents to the network interface.

8. The interface module of claim 7 wherein the HTTP task accepts a connection, parses an HTTP request, and calls the real time operating system to process the request.

9. The interface module of claim 3 wherein the interface module allows a user at a remote location to view data within the at least one input/output device from a browser connected to the Internet.

10. The interface module of claim 1 wherein the data transfer enabling means includes a dual TCP/IP stack.

11. The interface module of claim 10 wherein the dual TCP/IP stack comprises a first stack capable of handling a broad range of TCP/IP messages and a second stack capable of handling a less broad range of TCP/IP messages more quickly than the first stack.

12. An interface module for receiving data requests from a remote location in order to provide access to an at least one input/output device from a communication network, the module comprising:
    a central processing unit;
    a network interface for communicating with the communication network;
    a protocol stack; and,
    a HTTP web server in communication with the protocol stack, the server providing a web browser with information on the status of the input/output device.

13. The interface module of claim 12 wherein the communication network is a world-wide network known as the Internet using an Internet Protocol (IP).

14. The interface module of claim 13 wherein the interface module functions as a web site on the Internet, the interface module including a global IP address.

15. The interface module of claim 12 wherein the network interface is an Ethernet driver.

16. The interface module of claim 12 wherein the protocol stack is a Transmission Control Protocol stack.

17. A control system for allowing a user access at a remote site through a communication network to information and data contained in an industrial control system having at least one input/output module, the system comprising:
    means for coupling the remote site to the communication network, the coupling means including a web browser for interacting with the communication network;
    a web site associated with the industrial control system and accessible through the communication network;
    means for linking the industrial control system to the web site, the linking means including an interface module for coupling the at least one input/output module to the communication network;
    means for coupling the interface module to the at least one input/output module, the coupling means for transferring data between the interface module and the at least one input/output module;
    means for processing data requests received from the remote location over the communication network;
    means for enabling a data transfer between the remote location and the industrial control system; and
    means for interfacing a protocol task with the at least one input/output module, the interfacing means for receiving a data request from the enabling means, for accessing the industrial control system for the requested data, and for sending a response to the remote location through the enabling means, the response in a framework supplied by an operating system located in the at least one input/output module.

18. The control system of claim 17 wherein the communication network is a worldwide network known as the Internet using an Internet Protocol (IP).

19. The control system of claim 18 wherein the interface module functions as a web site on the Internet, the interface module including a global IP address.

20. The control system of claim 19 wherein the interface module means includes a network driver for receiving data requests from the web browser on the Internet and for sending a response back to the web browser.

21. The control system of claim 20 wherein the processing data requests means includes a client task for initiating a request received from the communication network and a server task for processing data requests received from the communication network.

22. The control system of claim 21 wherein the data transfer enabling means includes a protocol stack using a Transmission Control Protocol (TCP) stack.

23. The control system of claim 22 wherein the protocol task interfacing means includes a server task using Hyper-Text Transport Protocol (HTTP) to deliver hypertext documents to the network coupling means.

24. The control system of claim 23 wherein the framework creates a HTTP task, accepts a connection, parses the HTTP request and calls the operation system to process the request.

25. The control system of claim 24 wherein the data requests allow the user at the remote location to view data within the industrial control system from the browser, the data including any program information stored in memory associated with the industrial control system.

26. The control system of claim 24 wherein the data requests allow the user at the remote location to write data within the industrial control system from the browser, the data including any program information stored in memory associated with the industrial control system.

27. The control system of claim 25 wherein the data requests further include requests for configuration views and status of the at least one input/output module coupled to the control system.

28. The control system of claim 26 wherein the data requests further include requests for configuration views and status of the at least one input/output module coupled to the control system.

29. The control system of claim 27 wherein the data requests further allow the user at the remote location to view any program information stored in memory associated with the input/output module.

30. The control system of claim 28 wherein the data requests further allow the user at the remote location to view any program information stored in memory associated with the input/output module.

31. A control system for allowing access to an input/output device from a communication network using a browser at a remote location, the control system comprising:
   an interface module having a microprocessor and a network interface for coupling the interface module to the communication network;
   a driver for coupling the interface module to the input/output device and for transferring data between the interface module and the input/output device;
   a protocol stack to enable data transfer between the remote location and the input/output device; and,
   a server task for processing data requests received from the communication network, the server task for interfacing a data request from the protocol stack accessing the input/output device for the requested data, and for sending a response to the remote location through the protocol stack and network interface, the response in a framework supplied by the operating system.

32. The control system of claim 31 wherein the communication network is a worldwide network known as the Internet using an Internet Protocol (IP).

33. The control system of claim 32 wherein the Interface module functions as a web site on the Internet.

34. The control system of claim 33 wherein the protocol stack is a Transmission Control Protocol (TCP)/IP stack.

35. The control system of claim 34 wherein the server task uses Hyper Text Transport Protocol (HTTP) to deliver hypertext documents, and the framework for creating a HTTP task, accepting a connection, parsing the HTTP request and calling the operating system to process the request.

36. The control system of claim 35 wherein the data requests allow a user at the remote location to view data within the input/output device.

37. The control system of claim 35 wherein the data requests allow a user at the remote location to write data within the input/output device.

38. The control system of claim 36 wherein the data requests further include views of the input/output device configuration and status.

39. The control system of claim 38 wherein the data requests further allow the user at the remote location to view data and any program information stored in the memory associated with the input/output device.

40. The control system of claim 37 wherein the data requests further allow the user at the remote location to write data and any program information into the memory associated with the input/output device.

* * * * *